US012683529B2

(12) United States Patent
Usuku et al.

(10) Patent No.: US 12,683,529 B2
(45) Date of Patent: Jul. 14, 2026

(54) POWER CONTROLLER FOR LINEAR ACTUATOR IN DOCKING DEVICE

(71) Applicants: IHI AEROSPACE CO., LTD., Tokyo (JP); JAPAN AEROSPACE EXPLORATION AGENCY, Tokyo (JP)

(72) Inventors: Koshiro Usuku, Tokyo (JP); Michio Isayama, Tokyo (JP); Akira Mochigi, Tokyo (JP); Kenta Nagahama, Tokyo (JP); Tadashi Masuoka, Tokyo (JP); Kaname Kawatsu, Tokyo (JP)

(73) Assignees: IHI AEROSPACE CO., LTD., Tokyo (JP); JAPAN AEROSPACE EXPLORATION AGENCY, Tokyo (JP)

( * ) Notice: Subject to any disclaimer, the term of this patent is extended or adjusted under 35 U.S.C. 154(b) by 500 days.

(21) Appl. No.: 18/039,463

(22) PCT Filed: Dec. 2, 2021

(86) PCT No.: PCT/JP2021/044330
§ 371 (c)(1),
(2) Date: May 30, 2023

(87) PCT Pub. No.: WO2022/138053
PCT Pub. Date: Jun. 30, 2022

(65) Prior Publication Data
US 2024/0022189 A1     Jan. 18, 2024

(30) Foreign Application Priority Data
Dec. 21, 2020     (JP) ................................. 2020-211092

(51) Int. Cl.
*H02P 9/00* (2006.01)
*B64G 1/64* (2006.01)
(Continued)

(52) U.S. Cl.
CPC .............. *H02P 9/008* (2013.01); *B64G 1/646* (2013.01); *H02K 7/1869* (2013.01); *B64G 2004/005* (2013.01)

(58) Field of Classification Search
CPC .... H02P 9/00; H02P 9/008; H02P 5/00; H02P 5/46; H02P 5/50; H02P 5/74;
(Continued)

(56) References Cited

U.S. PATENT DOCUMENTS

| | | | |
|---|---|---|---|
| 6,354,540 B1 | 3/2002 | Lewis et al. | |
| 2019/0140564 A1* | 5/2019 | Li | H02P 6/08 |
| 2020/0024011 A1 | 1/2020 | Isayama | |

FOREIGN PATENT DOCUMENTS

| | | |
|---|---|---|
| CN | 111547280 A | 8/2020 |
| JP | 2015-008590 A | 1/2015 |

(Continued)

OTHER PUBLICATIONS

International Preliminary Report on Patentability dated Jun. 13, 2023 with a Translation of the Written Opinion of the International Searching Authority in Application No. PCT/JP2021/044330.

(Continued)

*Primary Examiner* — Tulsidas C Patel
*Assistant Examiner* — Joshua Kiel M Rodriguez
(74) *Attorney, Agent, or Firm* — Sughrue Mion, PLLC

(57) ABSTRACT

A power controller of a linear actuator 10 in a docking device 1 including a six-axis parallel link mechanism 5, wherein a motor driver 11 configured to control rotation speed of a motor M of the linear actuator 10 on the basis of a load produced on the link 4 includes a speed controlling unit 31 that outputs a current command, a current controlling unit 32 that converts the current command to a voltage command, and a current command limiter 33 that limits the current command of the speed controlling unit 31 so that
(Continued)

power consumption per one linear actuator 10 is one sixth or less of the power supply capacity for the motor power, thus allowing for mounting the docking device 1 even for a spacecraft with a small power supply capacity, without requiring modification of the power supply capacity.

4 Claims, 4 Drawing Sheets

(51) Int. Cl.
    B64G 4/00           (2006.01)
    H02K 7/18           (2006.01)
(58) Field of Classification Search
    CPC .... B64G 1/646; B64G 2004/005; B64G 1/64;
                                      H02K 7/1869
    See application file for complete search history.

(56) References Cited

FOREIGN PATENT DOCUMENTS

| | | | |
|----|--------------|-----|---------|
| JP | 2016-062779 | A | 4/2016 |
| JP | 2018-172025 | A | 11/2018 |
| WO | 2018/180086 | A1 | 10/2018 |
| WO | 2020/048579 | A1 | 3/2020 |

OTHER PUBLICATIONS

International Search Report for PCT/JP2021/044330 dated Feb. 15, 2022.
Written Opinion for PCT/JP2021/044330 dated Feb. 15, 2022.

\* cited by examiner

POWER CONTROLLER FOR LINEAR ACTUATOR IN DOCKING DEVICE

CROSS REFERENCE TO RELATED APPLICATIONS

This application is a National Stage of International Application No. PCT/JP2021/044330 filed Dec. 2, 2021, claiming priority based on Japanese Patent Application No. 2020-211092 filed Dec. 21, 2020.

TECHNICAL FIELD

The present invention relates to, in a docking device of a spacecraft including a parallel link mechanism, a power controller used for controlling power supplied to a linear actuator of the parallel link mechanism.

BACKGROUND ART

For example, one of conventional docking devices is described in Patent Document 1. The docking device described in Patent Document 1 is mounted on a spacecraft, and by controlling the extension and contraction speed of six linear actuators that configure a six-axis parallel link mechanism, the docking device accomplishes correction of misalignment between spacecrafts and attenuation of inertial force, at the time of docking with another spacecraft. Each linear actuator utilizes a method of driving, with a motor, a ball screw configured of a nut and a lead screw, and power is supplied to the motor from a power supply mounted on the spacecraft, via a driver.

CITATION LIST

Patent Documents

Patent Document 1: U.S. Pat. No. 6,354,540B1

SUMMARY OF INVENTION

Technical Problem

However, the conventional docking device as described above cannot supply enough power to the motor of the linear actuators if the power supply capacity of the spacecraft is small, which makes it impossible to mount the docking device on the spacecraft. Therefore, in order to enable mounting the docking device onto the spacecraft, modification to increase the power supply capacity is essential; this results in causing the problem of an increase in manufacturing costs of the spacecraft.

The present invention is accomplished in view of the above conventional situation, and its object is to provide a power controller of a linear actuator in a docking device, which power controller is capable of mounting a docking device without requiring any modification to increase the power supply capacity, even for a spacecraft with small power supply capacity.

Solution to Problem

A power controller of a linear actuator in a docking device according to the present invention is, in a docking device comprising a six-axis parallel link mechanism whose components are six links driven to extend and contract by the linear actuator, a device that controls power supplied to the linear actuator of each link. This power controller has a motor driver that controls rotation speed of a motor serving as a drive source of the linear actuator on the basis of a load produced in an axial direction of the link at the time of docking, the motor driver including a speed controlling unit that outputs a current command to the motor on the basis of a speed command of the motor, a current controlling unit that converts the current command from the speed controlling unit to a voltage command, and a current command limiter between the speed controlling unit and the current controlling unit, wherein the current command limiter limits the current command so that power consumption per one linear actuator is one sixth or less of the power supply capacity for the motor power.

Advantageous Effects of Invention

By employing the above configuration, the power controller of the linear actuator in the docking device according to the present invention can mount the docking device without requiring any modification to increase the power supply capacity, even for a spacecraft with small power source capacity.

DESCRIPTION OF EMBODIMENTS

Figure 1:
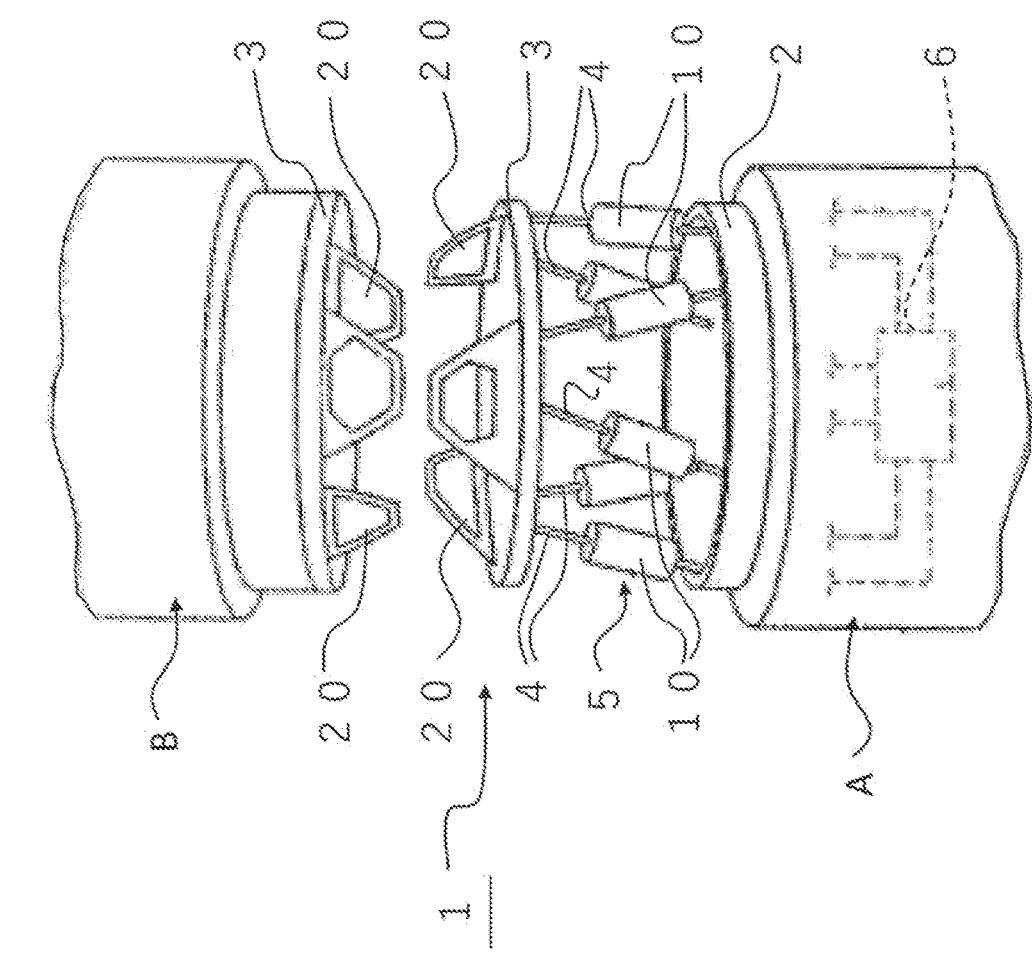
FIG. 1 is a perspective view describing one example of a docking device.

FIG. 1 is a view describing one example of a docking device that can apply a power controller of a linear actuator according to the present invention. The illustrated docking device 1 is mounted on one spacecraft A flying through space by inertia, and is used to join with another spacecraft B that also flies through space by inertia.

The above docking device 1 includes a base ring 2 disposed on a joining part of one spacecraft A, a capture ring 3 contacting the other spacecraft B at the time of docking, a parallel link mechanism 5 configured of six links 4 that extend and contract by a linear actuator 10 and which links the base ring 2 and the capture ring 3 with six degree-of-freedom, and a controlling unit 6 for controlling the linear actuator 10 of each link 4.

The power controller according to the present invention is at least one part of the controlling unit 6.

Moreover, the docking device 1 includes, on the capture ring 3, a guide 20 arranged in an interval of 120 degrees. On the other hand, the joining part of the other spacecraft B is disposed with a capture ring 3 and a guide 20, which are similar to those of spacecraft A.

Although not illustrated, the linear actuator 10 utilize a method of driving, with a motor, a ball screw configured of a nut and a lead screw, and includes a load cell for measuring a load produced in the axial direction of the links 4, and sensors such as a pulse encoder for measuring rotation speed of the motor.

In the joining process of the spacecrafts, the above docking device 1 measures the load data and axial direction data in each of the links 4 of the parallel link mechanism 5 when the capture ring 3 contacts the other spacecraft B, calculates a load vector and a torque vector at the center of the capture ring 3 on the basis of these data, and controls the extension and contraction movement of each of the links 4 by the linear actuators 10 on the basis of these vectors. This allows for the docking device 1 to control the behavior of the capture ring 3 to correct any misalignment between spacecrafts, and adjusts the extension and contraction speed of the linear actuators 10 so that the load applied on the links 4 is gradually reduced to attenuate the inertial force that the other spacecraft B has.

The power controller of the linear actuator 10 in the above docking device is a device that controls the power supplied to the linear actuator 10 of each of the links 4, and configures the control system of the linear actuator 10 by virtual compliance control. Virtual compliance control, as with known compliance systems, controls the operating speed of each of the linear actuators by detecting the force/moment applied on the parallel link mechanism 5 from a load cell or the like to serve as a virtual spring mass damper system, and accomplishes a docking with hardly no impact.

Figure 2:
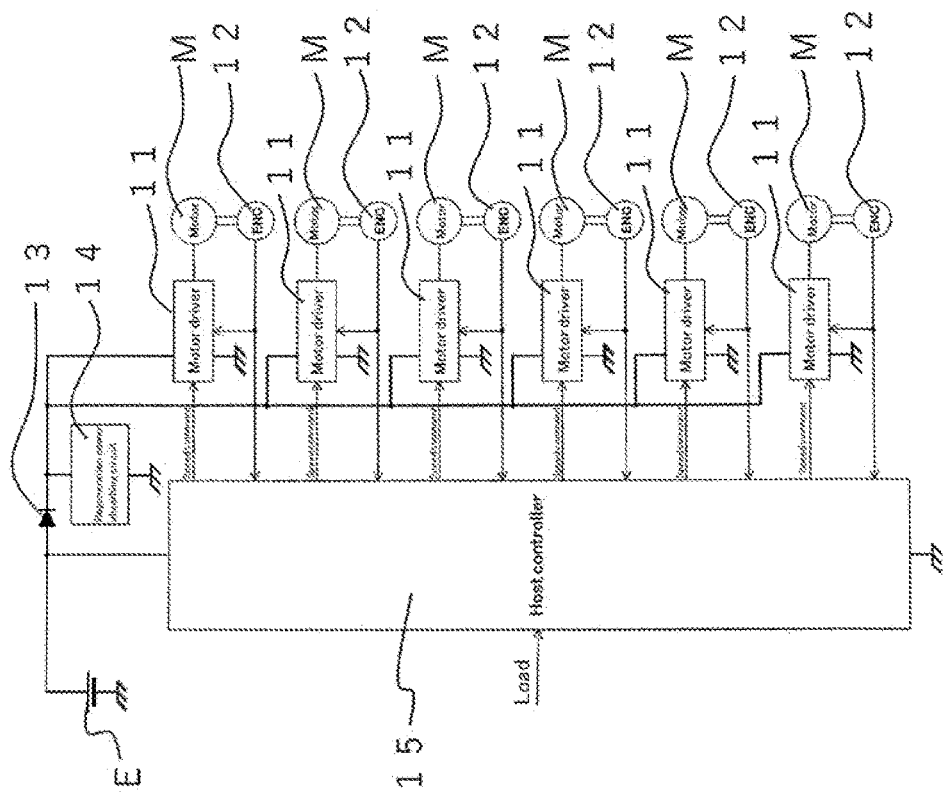
FIG. 2 is a block diagram showing the overall control system.

The power controller of the above linear actuator 10 comprises, as shown in FIG. 2, for a motor driver 11, a motor M and an encoder 12 provided for each link 4, a power supply E, a backflow prevention diode 13, a regeneration power absorbing circuit 14, and a host controller 15 for performing the virtual compliance control. The host controller inputs the load produced in the axial direction of the link 4 at the time of docking, and outputs a speed command to the motor driver 11 on the basis of this load. Then, by controlling the rotation speed of the motor M in each link 4, the host controller 15 controls the extension and contraction movement of the links 4 and the behavior of the capture ring 3 to perform the aforementioned misalignment correction and the attenuation of inertial force.

Figure 3:
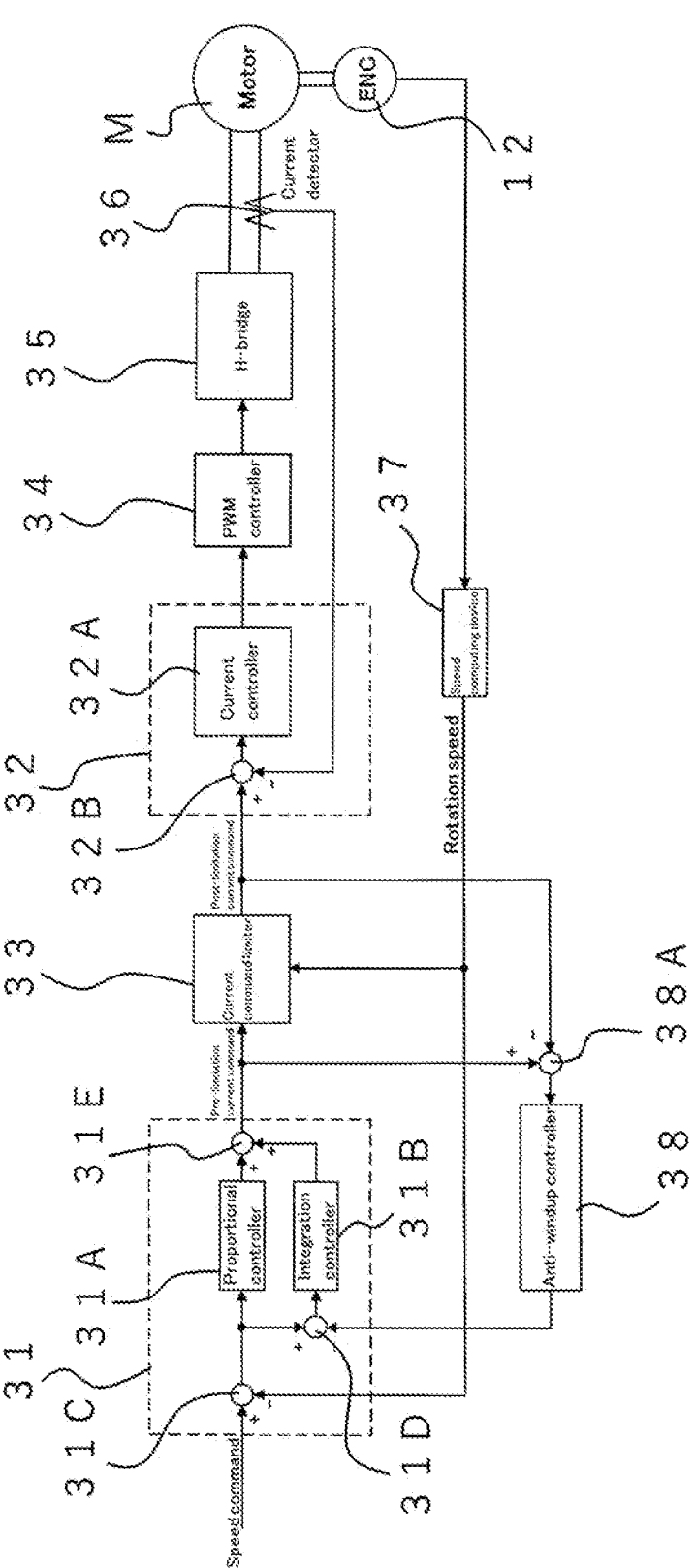
FIG. 3 is a block diagram describing a motor driver.

The above motor driver 11 includes, as shown in FIG. 3, a speed controlling unit 31 that outputs a current command on the basis of a speed command of the motor M obtained by the virtual compliance control, and a current controlling unit 32 that converts the current command from the speed controlling unit 31 to a voltage command, as well as a current command limiter 33 between the speed controlling unit 31 and the current controlling unit 32, which current command limiter 33 limits the current command so that the power consumption per one linear actuator 10 is one sixth or less of the power supply capacity distributed for the power of the motor M.

It should be noted that the upstream power supply of the motor driver 11 is used as the control power supply for the host controller 15 and each motor driver 11, other than for the power of the motor M. Therefore, the power supply capacity subjected to limitation at the current command limiter 33 is the power supply capacity distributed from the upstream power supply for the power of the motor M, and is not the total capacity of the main power supply mounted on the spacecraft (power supply capacity of the spacecraft).

The speed controlling unit 31 includes a proportional controller 31A, an integration controller 31B, first and second adder-subtracters 31C, 31D on the input side, and a third adder-subtracter 31E on the output side. The current controlling unit 32 includes a current controller 32A and an input-side adder-subtracter 32B. The current command limiter 33 inputs a pre-limitation current command from the third adder-subtracter 31E of the speed controlling unit 31, and outputs a post-limitation current command to the input-side adder-subtracter 32B of the current controlling unit 32.

Moreover, the motor driver 11 includes, in series from the current controlling unit 32 to the motor M, a PWM controller 34 into which the voltage command is inputted, and an H-bridge circuit 35. Furthermore, the motor driver 11 includes a current detector 36 for detecting a current of the motor M, an encoder 12 for detecting rotation of the motor M, a speed computing device 37 for calculating the rotation speed of the motor M from the detected value of the encoder 12, and an anti-windup controller 38.

The current detector 36 is disposed between the H-bridge circuit 35 and the motor M, and inputs the detected current value to the input-side adder-subtracter 32B of the current controlling unit 32. The rotation speed of the motor M calculated by the speed computing device 37 is inputted into the first adder-subtracter 31C of the speed controlling unit 31 and the current command limiter 33.

With the above configuration, the motor driver 11 generates an operation amount by PI computing the difference between the post-limitation current command and the current of the motor M, in the current controller 32A of the current controlling unit 32. Based on the operation amount inputted from the current controller 32A, the PWM controller 34 determines a duty ratio of a PWM signal for control to be provided to the H-bridge circuit 35, and controls the voltage to be applied on the motor M.

The anti-windup controller 38 inputs the aforementioned pre-limitation current command and post-limitation current command via the adder-subtracter 38A, multiplies a proportional gain to the differential value between the pre-limitation current command and the post-limitation current command, and subtracts that solution from an input of the integration controller 31B. Accordingly, the anti-windup controller 38 appropriately limits the integrated value of the integration controller 31B, to prevent an anti-windup phenomenon caused by output saturation of the speed controlling unit 31.

How the current command is limited here in the current command limiter 33 is on the basis of a relationship of "power consumption per one motor driver 11 to which the power supply E supplies is the total of the power of the motor M driven by the motor driver 11 (rotation speed $\omega \times$ torque $\tau$) and a loss (total R of motor resistance and driver resistance$\times$motor current $i^2$)".

Here, provided that an input voltage of one motor driver 11 at the time of power running is Pd, the rotation speed of the motor M is $\omega$, the torque is $\tau$, the current is $i$, a torque constant is kt, and a combined resistance of the on-resistance of a driver FET and a coil resistance of the motor M is R, at the time of power running, there is the relationship of the following Formula 1:

$$Pd = \tau \times \omega + R \times i^2 \qquad \text{Formula 1}$$

Moreover, there is a relationship of $\tau = kt \times i$ between the torque t and the current i, and thus Formula 1 can be represented as in the following Formula 2:

$$Pd = \omega \times kt \times i + R \times i^2 \qquad \text{Formula 2}$$

Accordingly, in the current command limiter 33, the input voltage Pd of the motor driver 11 is set to one sixth of a suppliable power (power supply capacity) of the power supply E, and is set to practically be one sixth or less of the power supply capacity to be distributed as the power of the motor M.

In the above Formula 2, since the torque constant kt and the combined resistance R are constants, and the input voltage Pd is also set to a constant value, when the rotation speed @ is provided, the current i at the time of power running is calculated by the following Formula 3:

$$i = \{-\omega \times kt + \sqrt{(\omega \times kt)^2 + 4 \times R \times Pd}\}/(2 \times R) \qquad \text{Formula 3}$$

Figure 4:
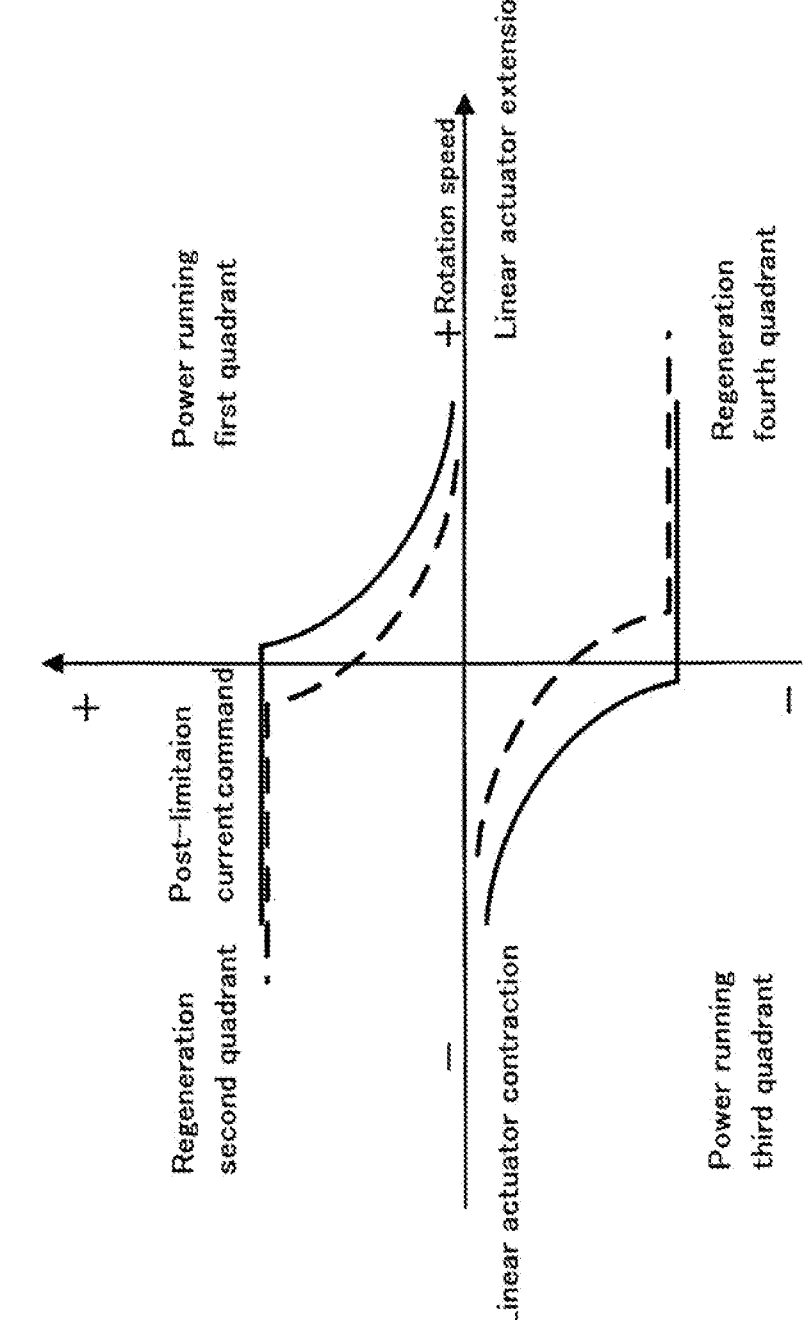
FIG. 4 is a graph describing a characteristic table of a current command limiter.

Therefore, at the current command limiter 33, a table showing characteristics in FIG. 4, namely a table of limit values of the current i with respect to the rotation speed ω of the motor M is prepared in advance, and the limit values of the current i with respect to the current rotation speed ω of the motor M is referred to from this table to limit the current.

In FIG. 4, power running is a state in which the motor M is rotationally driven in a direction in which the linear actuator 10 extends or contracts. Furthermore, regeneration is a state in which rotation is applied on the motor M by a load produced in an extending direction or a contracting direction of the linear actuator 10. The first quadrant in FIG. 4 is a region of power running in the extending state of the linear actuator 10, and the second quadrant is a region of regeneration in the contracting state of the linear actuator 10. Moreover, the third quadrant in FIG. 4 is a region of power running in the contracting state of the linear actuator 10, and the fourth quadrant is a region of regeneration in the extending state of the linear actuator 10.

In the above current command limiter 33, the limit value of the power running region indicates a limit value, which makes the input power of the motor driver 11 constant, and the limit value of the regeneration region is a limit value aiming to protect the motor driver 11 or to limit load. Namely, the current command limiter 33 of this embodiment changes its current limit between the power running region that rotationally drives the motor M and the regeneration region in which the motor M rotates by external load. At the time of regeneration, no power is supplied from the power supply of the spacecraft, so no current limitation needs to be performed. Moreover, the current at the time of regeneration prevents backflow to the power supply E, and further this current can be absorbed by the regeneration electric absorbing circuit 14 illustrated in FIG. 2. The above current command limiter 33 inputs the rotation speed of the motor M and a pre-limitation current command being an output of the speed controlling unit 31, and when this pre-limitation current command is greater than a post-limitation current command defined in the table shown in FIG. 4 in rotation speed of the motor M, the pre-limitation current command is outputted upon limiting it to the post-limitation current command. Moreover, when the pre-limitation current command is smaller than the post-limitation current command, the pre-limitation current command is outputted as it is as the post-limitation current command.

Moreover, when the limit value aiming for protecting the motor M and the motor driver 11, or the limit value aiming for load limitation is greater than the limit value calculated by Formula 3, when ω=0, the current command limiter 33 extends the limit curve of the power running region to the regeneration region in an opposite direction to the power running movement to set the limit value of current i, as shown by the dotted line in FIG. 4.

More specifically, when the linear actuator 10 is power running in the extending direction (first quadrant), its limit curve is extended to the regeneration region in the contracting direction (second quadrant) in the opposite direction to the power running movement (extending movement). Moreover, when the linear actuator 10 is power running in the contracting direction (third quadrant), its limit curve is extended to the regeneration region in the extending direction (fourth quadrant) in the opposite direction to the power running movement (contracting movement). This allows for preventing torque variation caused by the limit value of current i largely changing gradually.

The power controller of the linear actuator in the above docking device limits the current command in the current command limiter 33, so that the power consumption per one linear actuator 10 is one sixth or less of the power supply capacity distributed for power of the motor M. Thereby, even if the linear actuators 10 of all the links 4 perform the power running movement, their power consumption will not exceed the power supply capacity for the motor power.

Accordingly, the above power controller can mount the docking device 1 even for a spacecraft with small power source capacity, without requiring any modification to increase the power supply capacity, and can also contribute to the reduction in manufacturing costs of the spacecraft.

Moreover, the above power controller comprises the anti-windup controller 38, thus allowing for preventing the wind-up phenomenon that occurs due to the output saturation of the speed controlling unit 31, and further, in the current command limiter 33, when current limitation is performed on the basis of the power consumption limit only at the power running region, and no current limitation is performed on the basis of the power consumption limit at the regeneration region, the characteristics of the linear actuator 10 prior to the current limitation can be maintained at the regeneration region, thus allowing for performing the misalignment correction and inertial force attenuation equivalent to prior to the current limitation as the docking device.

The details in the configuration of the power controller of the linear actuator in the docking device according to the present invention is not limited to those of the above-described embodiments, and changes can be made in the configuration without departing from the features of the present invention.

REFERENCE SIGNS

1 Docking device
4 Link
5 Parallel link mechanism
10 Linear actuator
11 Motor driver
31 Speed controlling unit
32 Current controlling unit
33 Current command limiter
38 Anti-windup controller
E Power supply
M Motor

The invention claimed is:

1. A power controller of a linear actuator in a docking device, the docking device comprising a six-axis parallel link mechanism whose component is six links driven to extend and contract by the linear actuator, the power controller controlling power to be supplied to the linear actuator of each link, the power controller comprising a motor driver configured to control rotation speed of a motor serving as a drive source of the linear actuator on the basis of a load produced in an axial direction of the link at the time of docking, the motor driver comprising a speed controlling unit configured to output a current command to the motor based on a speed command of the motor, a current controlling unit configured to convert the current command from the speed controlling unit to a voltage command, and a current command limiter between the speed controlling unit and the current controlling unit, wherein the current command limiter limits the current command so that power consumption per one linear actuator is one sixth or less of the power supply capacity for the motor power, wherein the current command limiter has a table of a limit value of a current with respect to the rotation speed of the motor, and changes the limit value of the current between a power running region that rotationally drives the motor and a regeneration region in which the motor rotates by external load, and wherein, when a limit value aiming for protecting the motor and the motor driver or a limit value aiming for load limitation is greater than a limit value calculated from the table when the rotation speed of the motor is 0, the current command limiter extends a limit curve of the power running region to the regeneration region in an opposite direction to a power running movement, to set the limit value of the current.

2. The power controller of the linear actuator in the docking device according to claim 1, wherein the motor driver comprises an anti-windup controller configured to prevent output saturation in the speed controlling unit.

3. The power controller of the linear actuator in the docking device according to claim 2, wherein the current command limiter calculates a current i at the time of power running of the motor by the following formula:

$$i = \{-\omega \times kt + \sqrt{(\omega \times kt)^2 + 4 \times R \times Pd}\}/(2 \times R)$$

wherein $\omega$ is the rotation speed of the motor, kt is a torque constant of the motor, R is a sum of a motor resistance and a driver resistance, and Pd is an input voltage of one driver at the time of power running of the motor.

4. The power controller of the linear actuator in the docking device according to claim 1, wherein the current command limiter calculates a current i at the time of power running of the motor by the following formula:

$$i = \{-\omega \times kt + \sqrt{(\omega \times kt)^2 + 4 \times R \times Pd}\}/(2 \times R)$$

wherein $\omega$ is the rotation speed of the motor, kt is a torque constant of the motor, R is a sum of a motor resistance and a driver resistance, and Pd is an input voltage of one driver at the time of power running of the motor.

* * * * *